(12) United States Patent
Kashiwazaki et al.

(10) Patent No.: US 11,815,785 B2
(45) Date of Patent: Nov. 14, 2023

(54) WAVELENGTH CONVERSION OPTICAL ELEMENT

(71) Applicant: Nippon Telegraph and Telephone Corporation, Tokyo (JP)

(72) Inventors: Takahiro Kashiwazaki, Musashino (JP); Takeshi Umeki, Musashino (JP); Ryoichi Kasahara, Musashino (JP); Osamu Tadanaga, Musashino (JP); Koji Embutsu, Musashino (JP); Takushi Kazama, Musashino (JP); Nobutatsu Koshobu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1 day.

(21) Appl. No.: 17/613,601

(22) PCT Filed: May 27, 2019

(86) PCT No.: PCT/JP2019/020966
§ 371 (c)(1),
(2) Date: Nov. 23, 2021

(87) PCT Pub. No.: WO2020/240676
PCT Pub. Date: Dec. 3, 2020

(65) Prior Publication Data
US 2022/0236621 A1    Jul. 28, 2022

(51) Int. Cl.
*G02F 1/365* (2006.01)
*G02F 1/35* (2006.01)

(52) U.S. Cl.
CPC ............ *G02F 1/365* (2013.01); *G02F 1/3503* (2021.01)

(58) Field of Classification Search
CPC ......... G02F 1/3503; G02F 1/365; G02F 1/377
See application file for complete search history.

(56) References Cited

U.S. PATENT DOCUMENTS

| 2005/0134958 A1 | 6/2005 | Huang et al. |
| 2015/0015937 A1* | 1/2015 | Vermeulen ............ G02F 1/3519 385/2 |

FOREIGN PATENT DOCUMENTS

| JP | H05-34748 A | 2/1993 |
| JP | 2014-222331 A | 11/2014 |

OTHER PUBLICATIONS

Y. Nishida et al., *Direct-Bonded QPM-LN Ridge Waveguide with High Damage Resistance at Room Temperature*, Electronics Letters, vol. 39, No. 7, 2003, pp. 609-611.

* cited by examiner

*Primary Examiner* — Daniel Petkovsek
(74) *Attorney, Agent, or Firm* — Workman Nydegger

(57) ABSTRACT

A wavelength conversion optical element using a nonlinear optical effect of a device structure in which wavelength conversion efficiency rises as targeted when the length of a waveguide is increased is provided. The element adopts a waveguide structure using lithium niobate of a second-order nonlinear optical material. Wavelength conversion regions are formed to correspond to two linear waveguides extending in parallel to each other on a plane of the planar structure and correspond to the lengths of the two linear waveguides. One end side of the linear waveguide is an incident side of excitation light and one end side of the linear waveguide is an emission side of wavelength converted light. The linear waveguides excluding the incident side and the emission side are joined by a bent waveguide. Second-order nonlinear optical media forming the linear waveguides have polarization inversion structures in which directions of spontaneous polarization are periodically inverted with respect to a propagation direction of light.

7 Claims, 9 Drawing Sheets

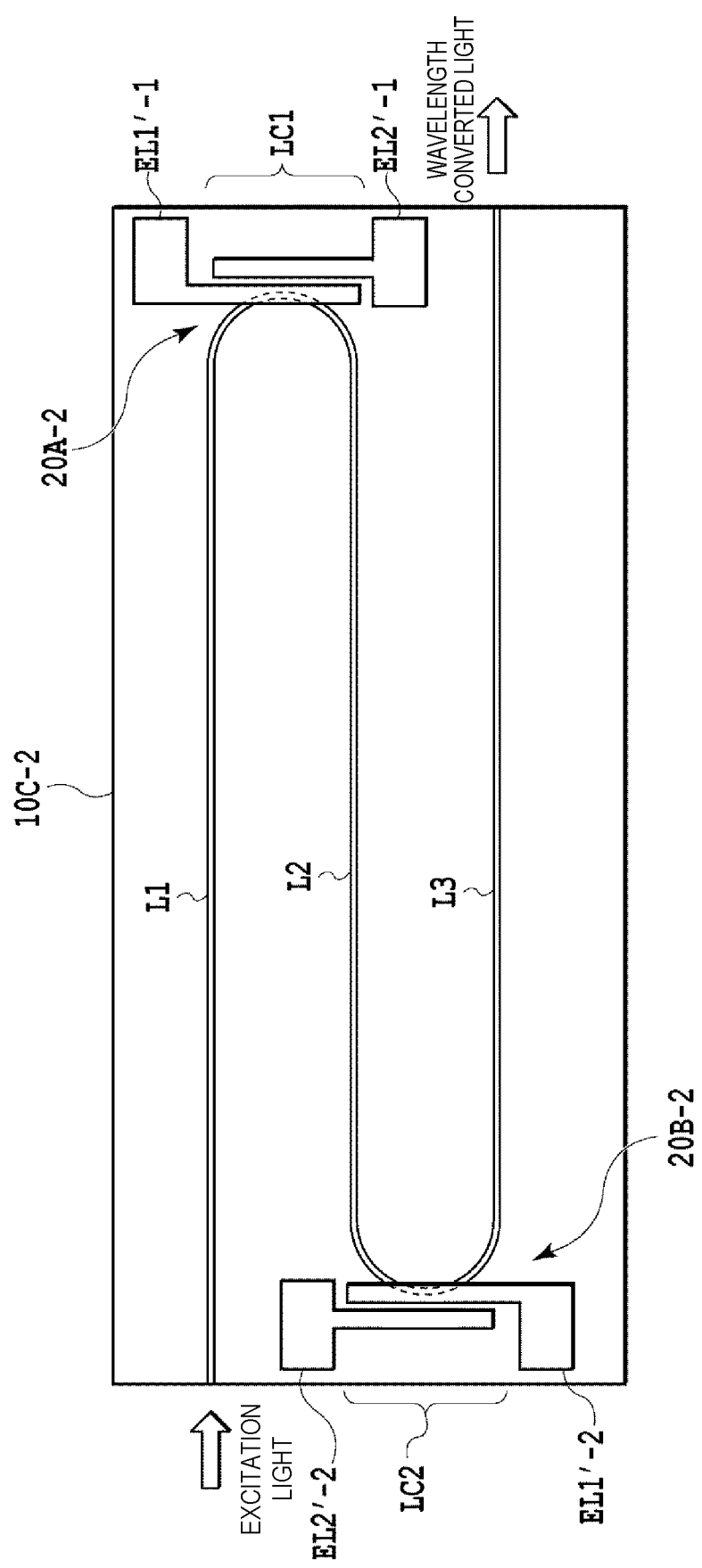

WAVELENGTH CONVERSION OPTICAL ELEMENT

TECHNICAL FIELD

The present invention relates to an optical element using nonlinear optical effects and, more particularly, to a wavelength conversion optical element having a planar structure by a second-order nonlinear optical material suitable for an optical communication system, an optical measurement system, and the like.

BACKGROUND ART

In recent years, development of an applied optical technology using nonlinear optical effects has been expected in a new optical communication field, a quantum information communication field using light, and the like. Among the nonlinear optical effects, wavelength conversion has been known as a basic effect. In the wavelength conversion, it is possible to convert light made incident on a nonlinear optical medium into light having another frequency.

There has been widely known a technique for, for example, in a single laser, generating light in a wavelength band in which oscillation is difficult, by using such a characteristic. A periodically polarized material is often given a name beginning with "PP" such as PPKTP (periodically polarized KTP), PPLN (periodically polarized lithium niobate), and PPLT (periodically polarized lithium tantalate). A PPLN crystal and a PPLT crystal are often used in an optical parametric oscillator, a frequency doubler, and the like and can also be used in a nonlinear waveguide.

In particular, a periodically polarized inverting waveguide using lithium niobate ($LiNbO_3$), which is a second-order nonlinear material and has a large nonlinear constant, enables, with combination of high nonlinearity of PPLN and strong confinement in a waveguide, an efficient nonlinear interaction even when an output level is considerably low. Therefore, the periodically polarized inverting waveguide has already been incorporated in commercially available light sources because of high efficiency of the nonlinear optical effect.

In general, in the second-order nonlinear optical effect, lights having wavelengths $\lambda 1$ and $\lambda 2$ are input to generate a new wavelength $\lambda 3$. Wavelength conversion satisfying a relational expression 1 of $1/\lambda 3 = 1/\lambda 1 + 1/\lambda 2$ is called sum frequency generation (SFG). In the case of $\lambda 1 = \lambda 2$, the relational expression 1 can be transformed. That is, wavelength conversion satisfying a relational expression 2 of $\lambda 3 = \lambda 1/2$ is called second harmonic generation (SHG). Further, wavelength conversion satisfying a relational expression 3 of $1/\lambda 3 = 1/\lambda 1 - 1/\lambda 2$ is called differential frequency generation (DFG).

Besides, there is also an optical parametric effect for inputting only the wavelength $\lambda 1$ and generating the wavelengths $\lambda 2$ and $\lambda 3$ satisfying the relational expression 3. In particular, SHG and SFG are often used for, for example, generation of a visible light region because light having a short wavelength, that is, light having high energy is generated anew with respect to input light.

Incidentally, in order to efficiently cause these second-order nonlinear optical effects, it is requested that a phase mismatch amount of interacting three wavelengths is 0. Therefore, the phase mismatch amount can be simulatively reduced to 0 by periodically inverting polarization of the second-order nonlinear optical material. When an inversion period at that time is represented as $\Lambda$, in the sum frequency generation indicated by the relational expression 1, $\lambda$ satisfying a relational expression 4 of $n3/\lambda 3 - n2/\lambda 2 - n1/\lambda 1 - 1/\Lambda = 0$ only has to be set with respect to the wavelengths $\lambda 1$, $\lambda 2$, and $\lambda 3$.

In the relational expression 4, n1 is a refractive index at the wavelength $\lambda 1$, n2 is a refractive index at the wavelength $\lambda 2$, and n3 is a refractive index at the wavelength $\lambda 3$. Highly efficient wavelength conversion is enabled by, in addition to such a periodically polarized inversion structure, performing waveguiding. The nonlinear optical effects increase as overlap density of light causing the nonlinear interaction is higher. Therefore, more highly efficient wavelength conversion is enabled if a waveguide structure capable of confining light in a small sectional area and guiding light over a long distance is adopted.

For example, in order to realize a waveguide structure using lithium niobate, which is a nonlinear optical crystal, a method by titanium (Ti) diffusion, proton exchange, or the like is generally used. However, recently, as a wavelength conversion element, as shown in Non-Patent Literature 1, a ridge-type optical waveguide having characteristics such as high optical damage resistance, long term reliability, and easiness of device design has been researched and developed by directly using characteristics of a bulk of crystal.

CITATION LIST

Non-Patent Literature

Non-Patent Literature 1: Y. Nishida, H. Miyazawa, M. Asobe, O. Tadanaga, and H. Suzuki, "Direct-bonded QPM-LN ridge waveguide with high damage resistance at room temperature," Electronics Letters, Vol. 39, No. 7, p. 609-611, 2003.

In this Non-Patent Literature 1, as a ridge-type optical waveguide, in a configuration, after bonding two substrates, one substrate is formed to be thinned and applied with ridge machining. When the substrates are bonded, as a technique for firmly bonding the substrates without using an adhesive or the like, a well-known technique for directly bonding the substrates is introduced. A direct bonding-type ridge-type waveguide using this bonding technique can make strong light incident and, moreover, is successful in a reduction in core size according to the development of a waveguiding technique. Accordingly, in such a direct bonding-type ridge-type waveguide, improvement of nonlinear optical wavelength conversion efficiency is conspicuous.

SUMMARY OF THE INVENTION

Technical Problem

In general, in a wavelength conversion optical element, in order to realize wavelength conversion efficiency higher than in the past, increasing a waveguide length while keeping a polarization inversion pattern and a waveguide shape is considered to be one solution.

However, even if one waveguide is extended, there is a problem in that wavelength conversion efficiency is not improved because of a shape error of a waveguide in a wafer in a waveguide machining process, nonuniformity of a polarization inversion structure, and the like.

There is a problem in that, in a configuration for only forming a waveguide as a linear waveguide, the length of the linear waveguide is greatly limited by a wafer size. Further, a wavelength conversion optical element sensitive to temperature needs to control the temperature of the waveguide.

However, when the waveguide is long and the device size is large, the temperature control is difficult, which results in a problem in that wavelength conversion efficiency does not rise.

That is, in the present situation, in the wavelength conversion optical element, it is a problem to realize a device structure in which wavelength conversion efficiency rises as targeted when the length of the waveguide is increased.

The present invention has been devised in order to solve the problem. Specifically, an object of the present invention is to provide a wavelength conversion optical element using a nonlinear optical effect of a device structure in which wavelength conversion efficiency rises as targeted when the length of a waveguide is increased.

Means for Solving the Problem

In order to achieve the object, an implementation form of the present invention is a wavelength conversion optical element having a planar structure made of a second-order nonlinear optical material. A wavelength conversion region in the planar structure includes at least two or more linear waveguides, the two or more linear waveguides excluding an incident side of excitation light and an emission side of wavelength converted light are joined by at least one or more bent waveguides bent in a curved shape, and second-order nonlinear optical media forming the two or more linear waveguides respectively have polarization inversion structures in which directions of spontaneous polarization are periodically inverted with respect to a propagation direction of light.

Effects of the Invention

According to the present invention, with the configuration explained above, it is possible to obtain a device structure in which wavelength conversion efficiency rises as targeted when the length of a waveguide is increased.

BRIEF DESCRIPTION OF DRAWINGS

FIG. 12 is a plan view showing, from the upper surface direction, a detailed configuration including an electrode pattern in the ridge-type waveguide structure in the case in which an optical phase control mechanism using an electro-optical effect is applied to the bent waveguide of the wavelength conversion optical element according to the third embodiment.

DESCRIPTION OF EMBODIMENTS

A wavelength conversion optical element of the present invention is explained in detail below with reference to the drawings while several embodiments are cited.

First Embodiment

Figure 1:
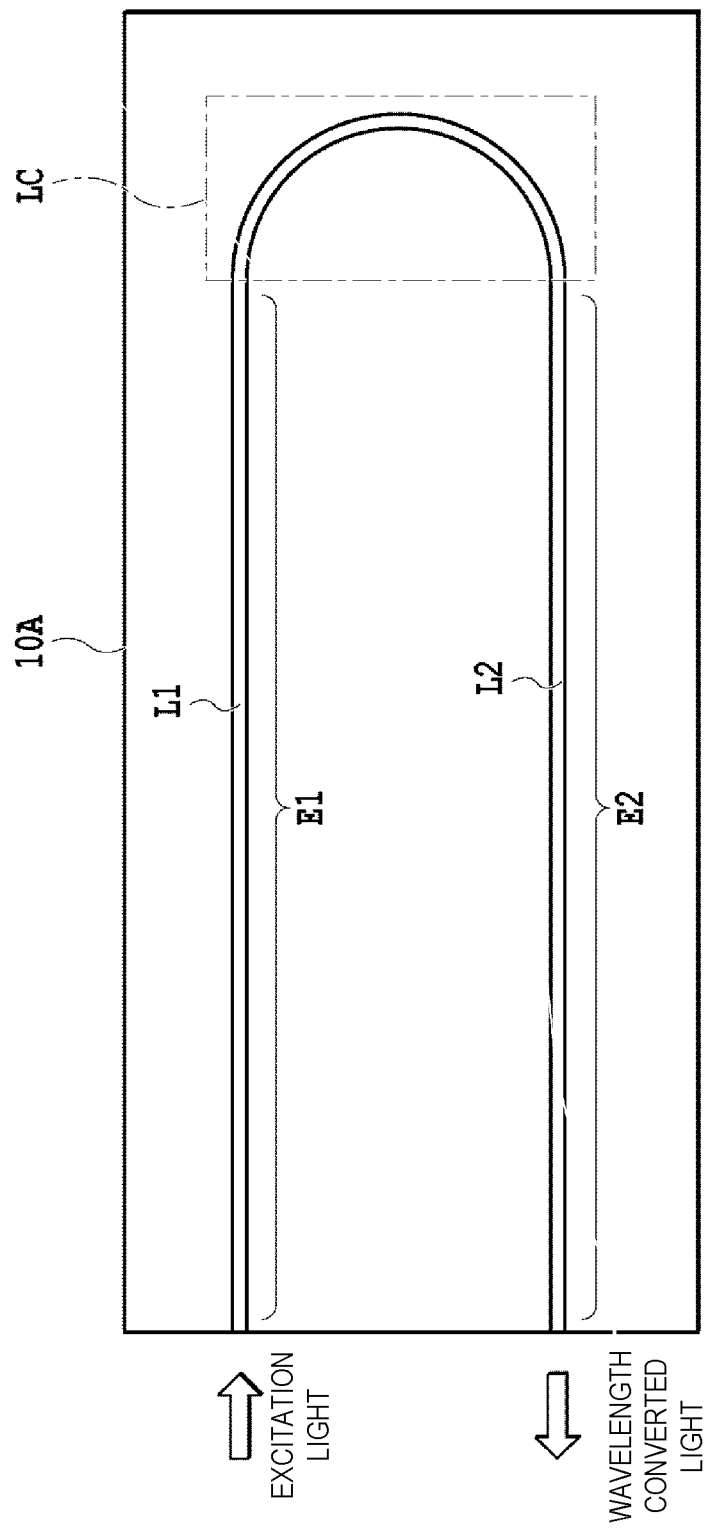
FIG. 1 is a plan view from the upper surface direction showing a basic configuration of a wavelength conversion optical element according to a first embodiment of the present invention.

FIG. 1 is a plan view from the upper surface direction showing a basic configuration of a wavelength conversion optical element 10A according to a first embodiment of the present invention.

Referring to FIG. 1, this wavelength conversion optical element 10A adopts a waveguide structure using lithium niobate as a planar structure made of a second-order nonlinear optical material. Wavelength conversion regions E1 and E2 in this planar structure are formed to correspond to two linear waveguides L1 and L2 extending in parallel to each other on a plane of the planar structure and correspond to the lengths of the two linear waveguides L1 and L2. One end side (the left side in FIG. 1) in the first linear waveguide L1 is an incident side of excitation light and one end side (the left side in FIG. 1) in the second linear waveguide L2 is an emission side of wavelength converted light. Further, the linear waveguides L1 and L2 excluding the incident side and the emission side are joined by a bent waveguide LC.

In the planar structure, second-order nonlinear optical media forming the linear waveguides L1 and L2 respectively have polarization inversion structures in which directions of spontaneous polarization are periodically inverted with respect to a propagation direction of light. However, polarization inversion periods of the polarization inversion structures in these linear waveguides L1 and L2 are an equal period. It is preferable that the second-order nonlinear optical media forming the linear waveguides L1 and L2 are made of a material containing $LiNbO_3$ or $LiNbO_3$ as a main component and containing, as an additive, at least one kind selected from among Mg, Zn, Sc, and In in the main component.

In this wavelength conversion optical element 10A, a waveguide includes a path leading from the linear waveguide L1 to the linear waveguide L2 through the bent waveguide LC.

Accordingly, incident excitation light is subjected to wavelength conversion in the wavelength conversion region E1 of the linear waveguide L1 and then reaches the linear waveguide L2 through the bent waveguide LC. The excitation light is subjected to wavelength conversion in the wavelength conversion region E2 of the linear waveguide L2 and then emitted as the wavelength converted light (also called signal light).

Figure 2:
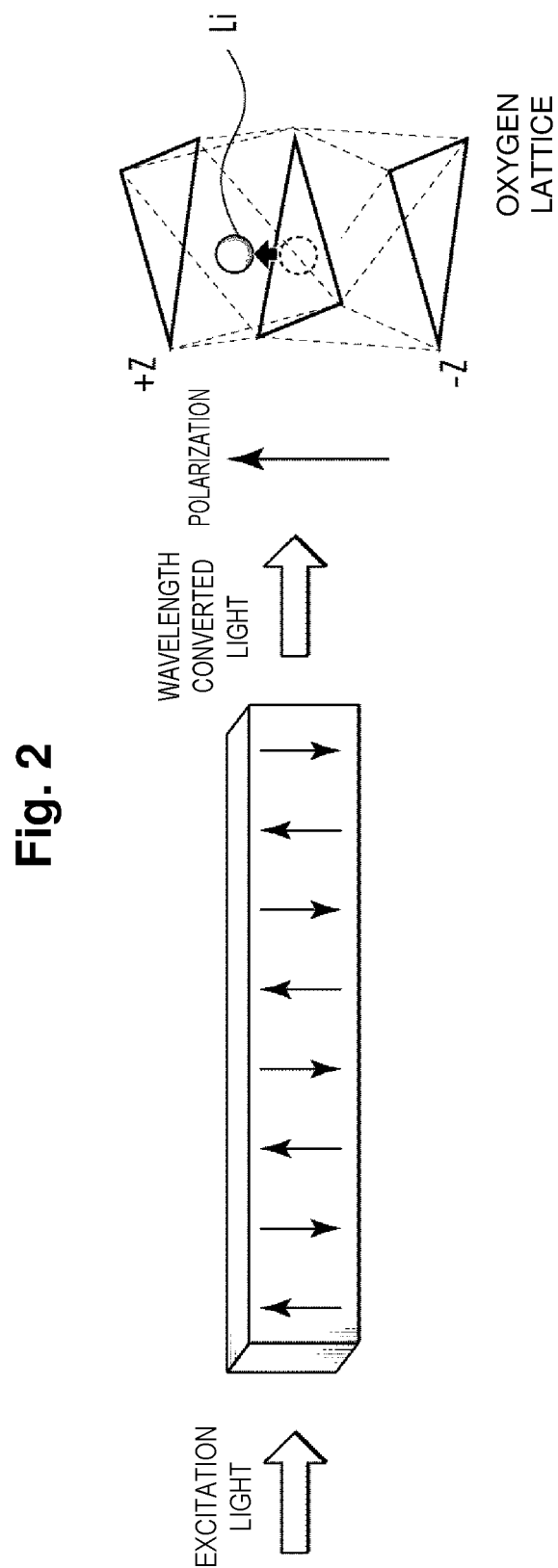
FIG. 2 is a schematic diagram for explaining, using movement of lithium in an oxygen lattice in a waveguide structure using lithium niobate, a relation between a propagation direction and a polarization inversion direction of excitation light made incident on the wavelength conversion optical element shown in FIG. 1.

FIG. 2 is a schematic diagram for explaining, using movement of lithium (Li) in an oxygen lattice in the waveguide structure, a relation between a propagation direction and a polarization inversion direction of excitation light made incident on the wavelength conversion optical element 10A having a periodic polarization inversion structure.

Referring to FIG. 2, spontaneous polarization occurs in a direction in which lithium moves in the oxygen lattice and a direction (an upward direction in a +z-axis direction in FIG. 2) of the spontaneous polarization is periodically inverted in the wavelength conversion optical element 10A. In the wavelength conversion region E1 of the linear waveguide L1 and the wavelength conversion region E2 of the linear waveguide L2, excitation light is made incident vertically to the direction of the spontaneous polarization and propagates in the periodic polarization inversion structure. As a result, the excitation light is wavelength-converted and emitted from the wavelength conversion optical element 10A.

In the wavelength conversion optical element 10A according to the first embodiment, it is possible to improve wavelength conversion efficiency by returning the excitation light and allowing the excitation light to pass through a plurality of wavelength conversion units. If an ideal waveguide without a propagation loss is assumed, more wavelength conversion occurs as the number of linear waveguides L1 and L2 is increased. In the case of such a structure, by forming the waveguide in a returning pattern, it is unnecessary to change the length of the entire wavelength conversion optical element 10A even if the length of the waveguide is increased. Temperature controllability can be maintained. Further, the linear waveguides L1 and L2 are less easily affected by a polarization inversion pattern and a manufacturing error in a plane of a wafer of the waveguide structure as the positions of the linear waveguides L1 and L2 are closer. Therefore, it is easier to realize high wavelength conversion efficiency.

Second Embodiment

Figure 3:
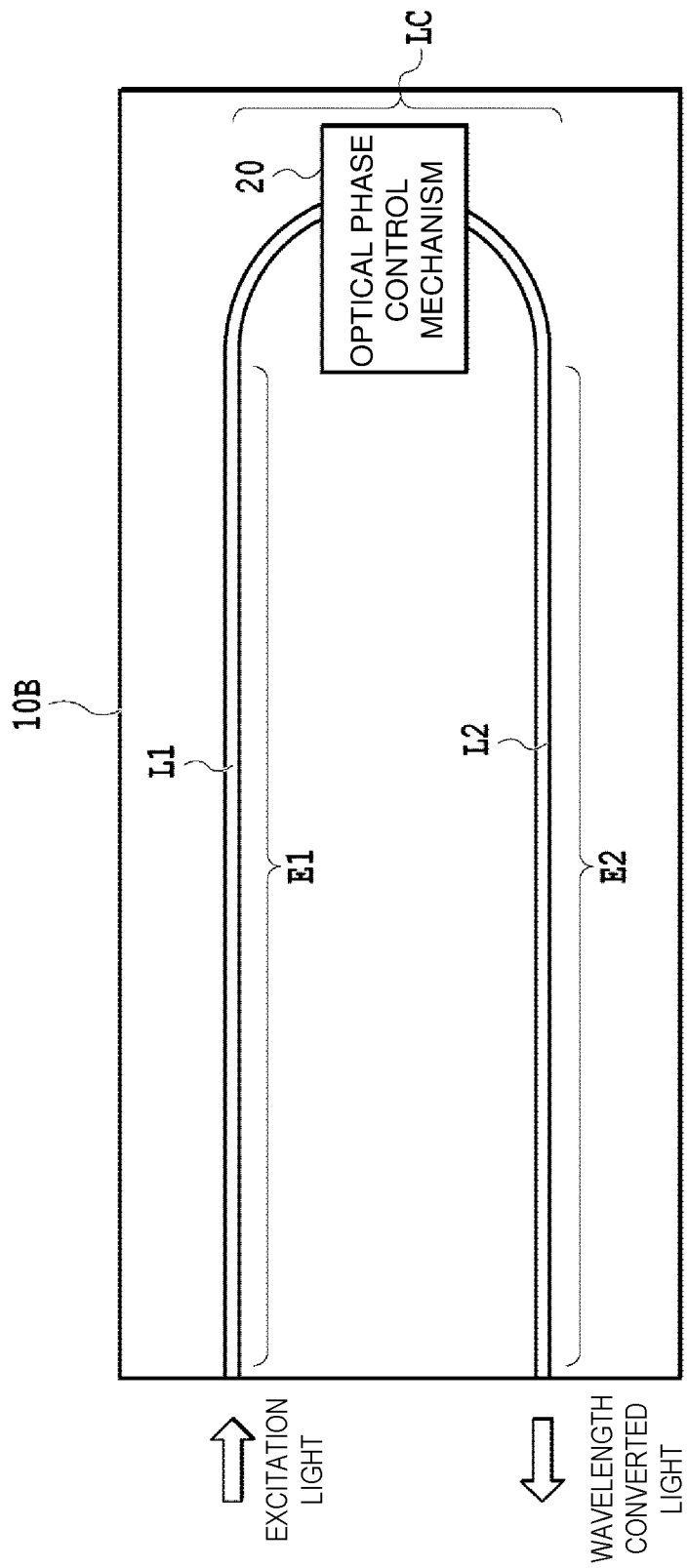
FIG. 3 is a plan view from the upper surface direction showing a basic configuration of a wavelength conversion optical element according to a second embodiment of the present invention.

FIG. 3 is a plan view from the upper surface direction showing a basic configuration of a wavelength conversion optical element 10B according to a second embodiment of the present invention.

Compared with the wavelength conversion optical element 10A in the first embodiment, this wavelength conversion optical element 10B is different in that the wavelength conversion optical element 10B includes, in the bent waveguide LC, an optical phase control mechanism 20 that controls relative phases of excitation light and wavelength converted light according to a change in a refractive index.

That is, in the case of the wavelength conversion optical element 10A in the first embodiment, a phase relation between excitation light and wavelength converted light emitted from the first linear waveguide L1 deviates in the bent waveguide LC. When the excitation light and the wavelength converted light are made incident on the second linear waveguide L2, if the phase relation is not aligned, light cannot be further converted in the wavelength conversion region E2 of the second linear waveguide L2. A situation in which lights desired to be amplified attenuate each other could occur according to the phase relation.

Therefore, in the wavelength conversion optical element 10B according to the second embodiment, the optical phase control mechanism 20 is included in the bent waveguide LC, whereby a refractive index is locally changed and the relative phases of the excitation light and the wavelength converted light are controlled. Consequently, it is possible to cause wavelength conversion at high efficiency. As examples of a mechanism for changing the refractive index, when roughly divided, there are two kinds of mechanisms, that is, a mechanism using an electro-optical effect and a mechanism using a thermo-optical effect by a local heater. Whichever of the mechanisms may be adopted. However, electrode structures suitable for the respective mechanisms have different configurations.

In the wavelength conversion optical element 10B according to the second embodiment as well, it is possible to improve the wavelength conversion efficiency by returning the excitation light and allowing the excitation light to pass through the plurality of wavelength conversion units. In this wavelength conversion optical element 10B, action effects equivalent to the action effects in the first embodiment are achieved. However, the relative phases are controlled by the optical phase control mechanism 20 in the bent waveguide LC. It is easier to realize high wavelength conversion efficiency more excellent in terms of characteristics.

Third Embodiment

Figure 4:
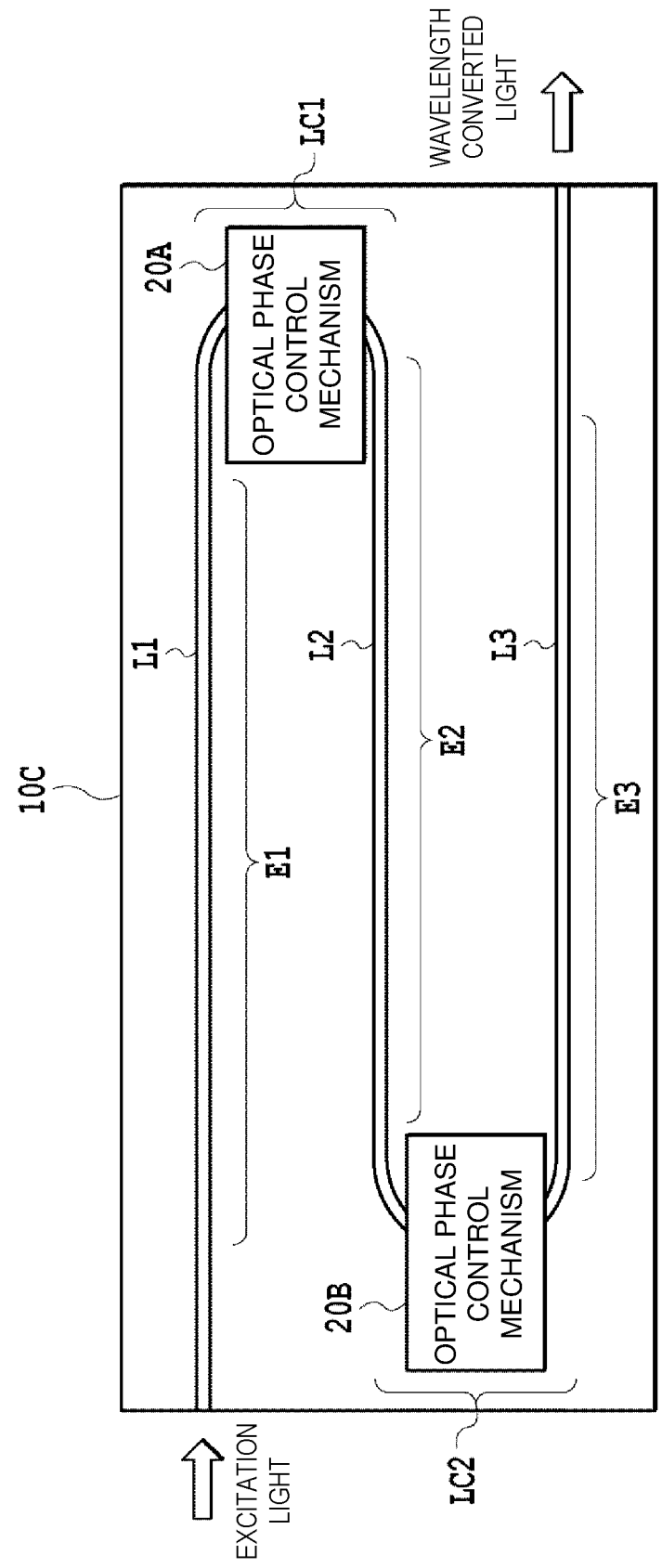
FIG. 4 is a plan view from the upper surface direction showing a basic configuration of a wavelength conversion optical element according to a third embodiment of the present invention.

FIG. 4 is a plan view from the upper surface direction showing a basic configuration of a wavelength conversion optical element 10C according to a third embodiment of the present invention.

Referring to FIG. 4, this wavelength conversion optical element 10C also adopts a waveguide structure using lithium niobate as a planar structure made of a second-order nonlinear optical material. Wavelength conversion regions E1, E2, and E3 in this planar structure are formed to correspond to three linear waveguides L1, L2, and L3 extending in parallel to one another on a plane of the planar structure and correspond to the lengths of the three linear waveguides L1, L2, and L3. One end side (the left side in FIG. 4) in the first linear waveguide L1 is an incident side of excitation light and the other end side (the right side in FIG. 4) in the third linear waveguide L3 is an emission side of wavelength converted light. Further, the linear waveguides L1, L2, and L3 excluding the incident side and the emission side are joined by bent waveguides LC1 and LC2.

Specifically, the linear waveguides L1 and L2 are joined by the bent waveguide LC1 and the linear waveguides L2 and L3 are joined by the bent waveguide LC2. Second-order nonlinear optical media forming the linear waveguides L1, L2, and L3 respectively have polarization inversion structures in which directions of spontaneous polarization are periodically inverted with respect to a propagation direction of light. However, polarization inversion periods of the polarization inversion structures in the linear waveguides L1, L2, and L3 are an equal period. It is preferable that the second-order nonlinear optical media forming the linear waveguides L1, L2, and L3 are made of a material containing $LiNbO_3$ or $LiNbO_3$ as a main component and containing, as an additive, at least one kind selected from among Mg, Zn, Sc, and In in the main component.

Optical phase control mechanisms 20A and 20B that control relative phases of excitation light and wavelength converted light according to a change in a refractive index are included in the bent waveguides LC1 and LC2. About these optical phase control mechanisms 20A and 20B as well, as explained in the second embodiment, as a mechanism that changes a refractive index, a mechanism using an electro-optical effect and a mechanism using a thermo-optical effect can be applied.

In this wavelength conversion optical element 10C, a waveguide includes a path leading from the linear waveguide L1 to the linear waveguide L2 through the bent waveguide LC1 and further leading from the linear waveguide L2 to the linear waveguide L3 through the bent waveguide LC2. Accordingly, incident excitation light is subjected to phase control by the optical phase control mechanism 20A and returned when being subjected to wavelength conversion in the wavelength conversion region E1 of the linear waveguide L1 and then passing the bent waveguide LC1. Thereafter, similarly, the excitation light is subjected to phase control by the optical phase control mechanism 20B and returned when being subjected to wavelength conversion in the wavelength conversion region E2 of the linear waveguide L2 and then passing the bent waveguide LC2. The excitation light is subjected to wavelength conversion in the wavelength conversion region E3 of the linear waveguide L3 and then emitted as wavelength converted light.

In this way, in the wavelength conversion optical element 10C, it is possible to improve wavelength conversion efficiency by returning the excitation light and allowing the excitation light to pass through a plurality of wavelength conversion units. In particular, in the bent waveguides LC1 and LC2 in which the excitation light is returned, attenuation caused from a relative phase relation is suppressed by including the optical phase control mechanisms 20A and 20B in order to control relative phases of the excitation light and the wavelength converted light.

For example, when a phase relation between the wavelength converted light and the excitation light amplified and converted in the first wavelength conversion region E1 of the first linear waveguide L1 deviates by a half wavelength when the wavelength converted light and the excitation light enter the second linear waveguide L2, the wavelength converted light attenuates in the second wavelength conversion region E2. In order to prevent this attenuation, a change in a refractive index relating to the optical phase control mechanism 20A is designed such that a relative phase in the bent waveguide LC1 is an integer time of $2n$. The same applies to the optical phase control mechanism 20B included in the bent waveguide LC2. In short, the optical phase control mechanisms 20A and 20B only have to be able to perform control to satisfy a condition that the optical phase control mechanisms 20A and 20B intensify the relative phases of each other.

Incidentally, in order to control the relative phases of the excitation light and the wavelength converted light in the bent waveguides LC1 and LC2, a method of performing temperature control of an entire element irrespective of the optical phase control mechanisms 20A and 20B can also be applied. However, in such a case, a phase matching wavelength is also a parameter sensitive to temperature and design is complicated. Therefore, the method is not considered a preferable application method.

In the wavelength conversion optical element 10C according to the third embodiment as well, it is possible to improve the wavelength conversion efficiency by returning the excitation light and allowing the excitation light to pass through the plurality of wavelength conversion units. In this wavelength conversion optical element 10C, the same action effects as the action effects in the first and second embodiments are achieved. Besides, the number of linear waveguides L1, L2, and L3 is increased. Moreover, the relative phases of the excitation light and the wavelength converted light are controlled in the bent waveguides LC1 and LC2. Accordingly, it is possible to realize remarkably excellent high wavelength conversion efficiency.

In the following explanation, modifications (variations) of detailed configurations about the wavelength conversion optical element 10B according to the second embodiment and the wavelength conversion optical element 10C according to the third embodiment having higher practicality than the wavelength conversion optical element 10A according to the first embodiment are explained.

Figure 5:
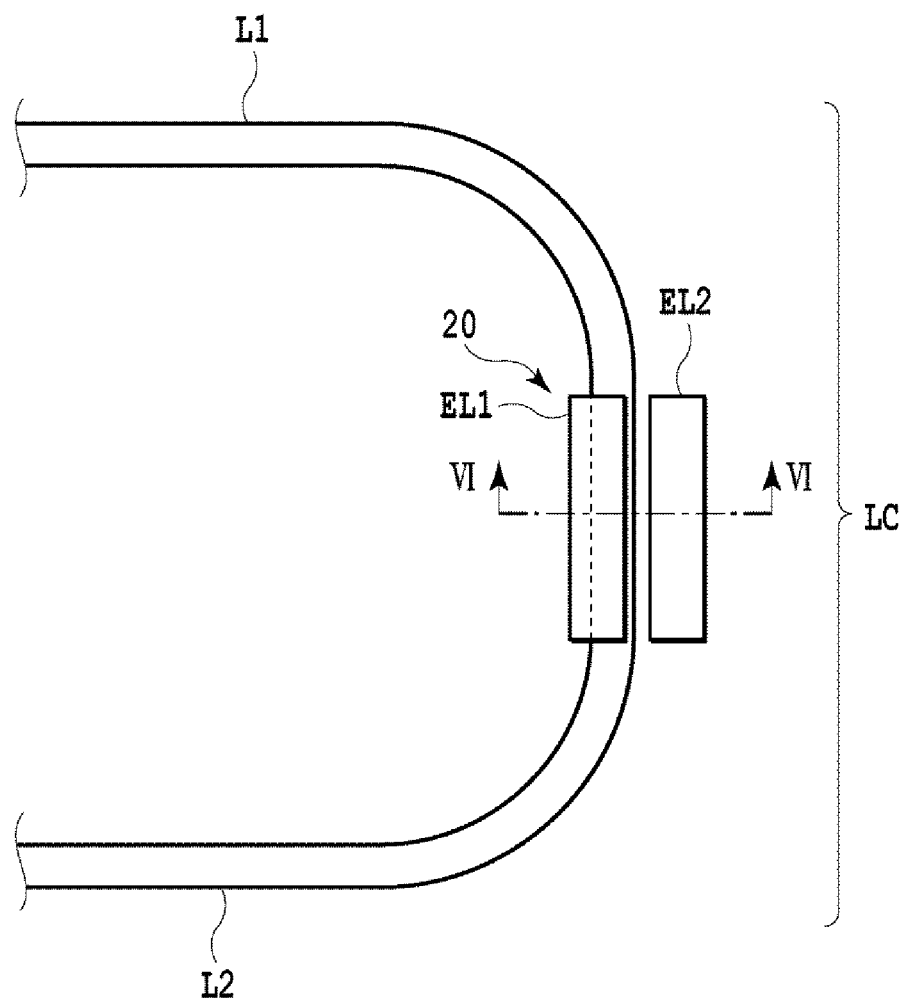
FIG. 5 is a plan view enlarging and showing, from the upper surface direction, an electrode pattern in the case in which an electro-optical effect is used in an optical phase control mechanism included in a bent waveguide of the wavelength conversion optical element according to the second embodiment.

FIG. 5 is a plan view enlarging and showing, from the upper surface direction, an electrode pattern in the case in which an electro-optical effect is used in the optical phase control mechanism 20 included in the bent waveguide LC of the wavelength conversion optical element 10B according to the second embodiment.

Referring to FIG. 5, the optical phase control mechanism 20 using the electro-optical effect is based on a premise that the optical phase control mechanism 20 includes a part close to the bent waveguide LC and metallic two kinds of electrodes EL1 and EL2 parallel to each other along a direction in which the bent waveguide LC extends are provided. When a potential difference is caused between these electrodes EL1 and EL2, an electric field is applied to a core of the bent waveguide LC. The bent waveguide LC changes to a structure in which a refractive index changes. At this time, the excitation light and the wavelength converted light propagating in the bent waveguide LC respectively cause different effective changes in the refractive index. As a result, relative phases of the excitation light and the wavelength converted light at the time when being emitted from the bent waveguide LC are controlled by the electric field.

Examples of a substance forming a substrate on which the optical phase control mechanism 20 is provided include a dielectric or a semiconductor such as silicon, silicon dioxide, lithium niobate, indium phosphide, or polymer or a compound obtained by adding an additive to the dielectric or the semiconductor. That is, the substrate only has to be a material transparent with respect to lights in two wavelength bands in use.

However, in the case of the optical phase control mechanism 20 using the electro-optical effect, concerning the metallic two kinds of electrodes EL1 and EL2, it is necessary to avoid light absorption by the metal. Accordingly, about the electrode EL1 provided in a part close to the core of the bent waveguide LC, a structure in which the electrode EL1 is not adjacent to the core of the bent waveguide LC is adopted.

Figure 6:
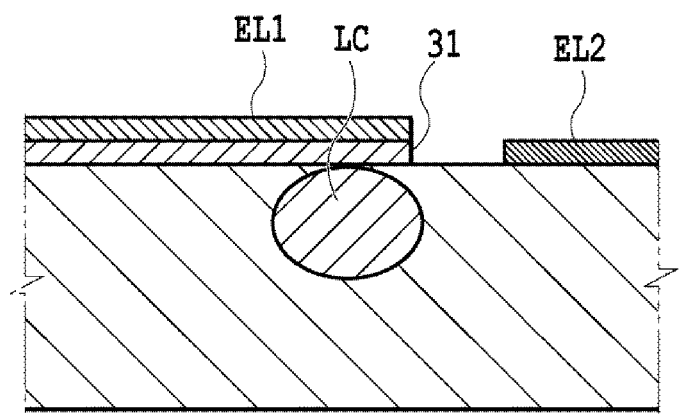
FIG. 6 is a diagram illustrating, in a cross section in a dotted line arrow direction in FIG. 5, an electrode pattern in the case in which an embedded-type waveguide structure is applied to the bent waveguide including the optical phase control mechanism shown in FIG. 5.

FIG. 6 is a diagram illustrating, in a cross section in a dotted line arrow direction in FIG. 5, an electrode pattern in the case in which an embedded-type waveguide structure is applied to the bent waveguide LC including the optical phase control mechanism 20 shown in FIG. 5.

Referring to FIG. 6, this electrode pattern includes the electrode EL1 provided, after a buffer layer 31 of $SiO_2$ or the like functioning as an insulating layer is provided in a part close to the core of the bent waveguide LC embedded in the substrate, on the upper surface of the buffer layer 31. This electrode pattern includes the electrode EL2 provided on the upper surface of the substrate in a part not close to the core of the embedded bent waveguide LC.

Figure 7:
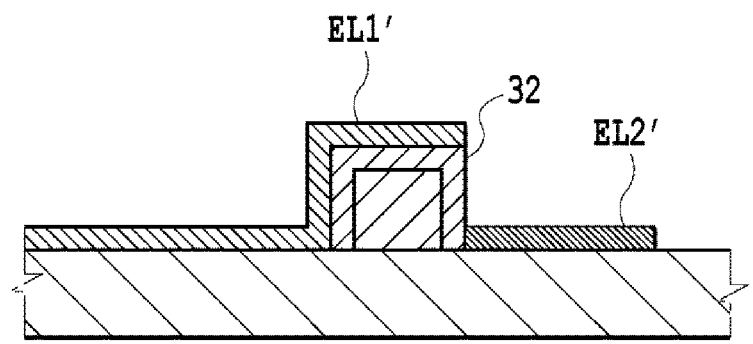
FIG. 7 is a diagram illustrating, in the cross section in the dotted line arrow direction in FIG. 5, an electrode pattern in the case in which a ridge-type waveguide structure is applied to the bent waveguide including the optical phase control mechanism shown in FIG. 5.

FIG. 7 is a diagram illustrating, in the cross section in the dotted line arrow direction in FIG. 5, an electrode pattern in the case in which a ridge-type waveguide structure is applied to the bent waveguide LC including the optical phase control mechanism 20 shown in FIG. 5.

Referring to FIG. 7, this electrode pattern includes an electrode EL1' provided, after the entire surface of a ridge functioning as the bent waveguide LC of the substrate is covered by a buffer layer 32 of $SiO_2$ or the like functioning as an insulating layer, to lead from the upper surface of the substrate to one side surface and the top surface of the ridge. This electrode pattern includes an electrode EL2' provided, to expose a part facing a top side of the other side surface of the ridge, on the upper surface of the substrate around the part.

Note that such a configuration using the electro-optical effect is also applicable in the optical phase control mechanisms 20A and 20B of the wavelength conversion optical element 10C according to the third embodiment.

Figure 8:
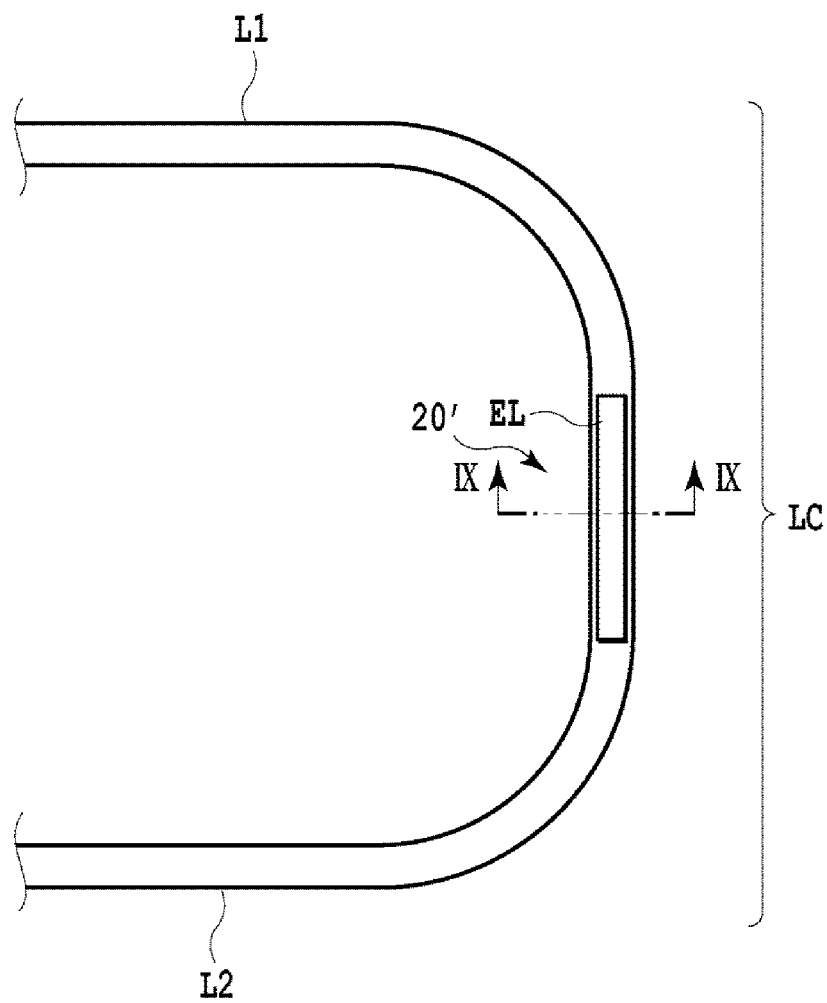
FIG. 8 is a plan view enlarging and showing, from the upper surface direction, an electrode pattern in the case in which a thermo-optical effect is used in an optical phase control mechanism included in the bent waveguide of the wavelength conversion optical element according to the second embodiment.

FIG. 8 is a plan view enlarging and showing, from the upper surface direction, an electrode pattern in the case in which a thermo-optical effect is used in an optical phase control mechanism 20' included in the bent waveguide LC of the wavelength conversion optical element 10B according to the second embodiment.

Referring to FIG. 8, in the case of the optical phase control mechanism 20' using the thermo-optical effect, unlike the case in which the electro-optical effect is used, one electrode EL only has to be provided in the electrode pattern. Examples of a substance forming a substrate on which the optical phase control mechanism 20' is provided include a dielectric or a semiconductor such as silicon, silicon dioxide, lithium niobate, indium phosphide, or polymer or a compound obtained by adding an additive to the dielectric or the semiconductor. That is, the substrate only has to be a material transparent with respect to lights in two wavelength bands in use. Note that, about the electrode pattern in the case in which the thermo-optical effect is used as well, it is preferable to adopt an electrode structure that is not adjacent to the core of the bent waveguide LC.

Figure 9:
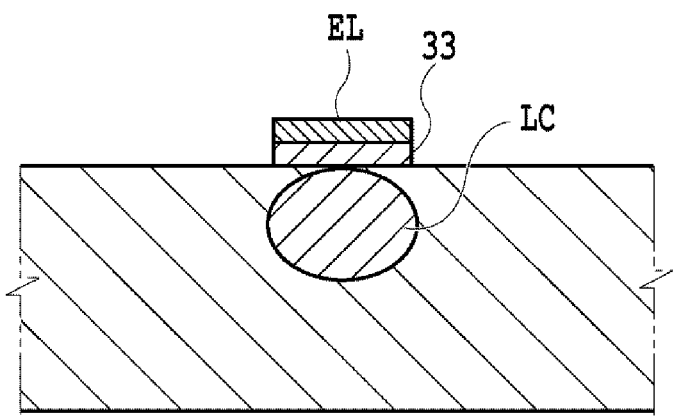
FIG. 9 is a diagram illustrating, in a cross section in a dotted line arrow direction in FIG. 8, an electrode pattern in the case in which the embedded-type waveguide structure is applied to the bent waveguide including the optical phase control mechanism shown in FIG. 8.

FIG. 9 is a diagram illustrating, in a cross section in a dotted line arrow direction in FIG. 8, an electrode pattern in the case in which the embedded-type waveguide structure is applied to the bent waveguide LC including the optical phase control mechanism 20' shown in FIG. 8.

Referring to FIG. 9, this electrode pattern includes the electrode EL provided, after a buffer layer 33 of $SiO_2$ or the like functioning as an insulating layer is provided in an upper surface part of the substrate close to the core of the bent waveguide LC embedded in the substrate, on the upper surface of the buffer layer 33.

Figure 10:
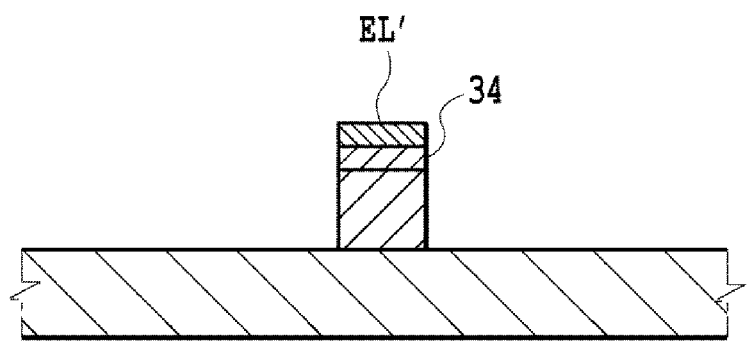
FIG. 10 is a diagram illustrating, in the cross section in the dotted line arrow direction in FIG. 8, an electrode pattern in the case in which the ridge-type waveguide structure is applied to the bent waveguide including the optical phase control mechanism shown in FIG. 8.

FIG. 10 is a diagram illustrating, in the cross section in the dotted line arrow direction in FIG. 8, an electrode pattern in the case in which the ridge-type waveguide structure is applied to the bent waveguide LC including the optical phase control mechanism 20' shown in FIG. 8.

Referring to FIG. 10, this electrode pattern includes an electrode EL' provided, after a buffer layer 34 of $SiO_2$ or the like functioning as an insulating layer is provided on the top surface of a ridge functioning as the bent waveguide LC of the substrate, on the upper surface of the buffer layer 34.

Note that the configuration using the thermo-optical effect is also applicable in the optical phase control mechanisms 20A and 20B of the wavelength conversion optical element 10C according to the third embodiment.

Figure 11:
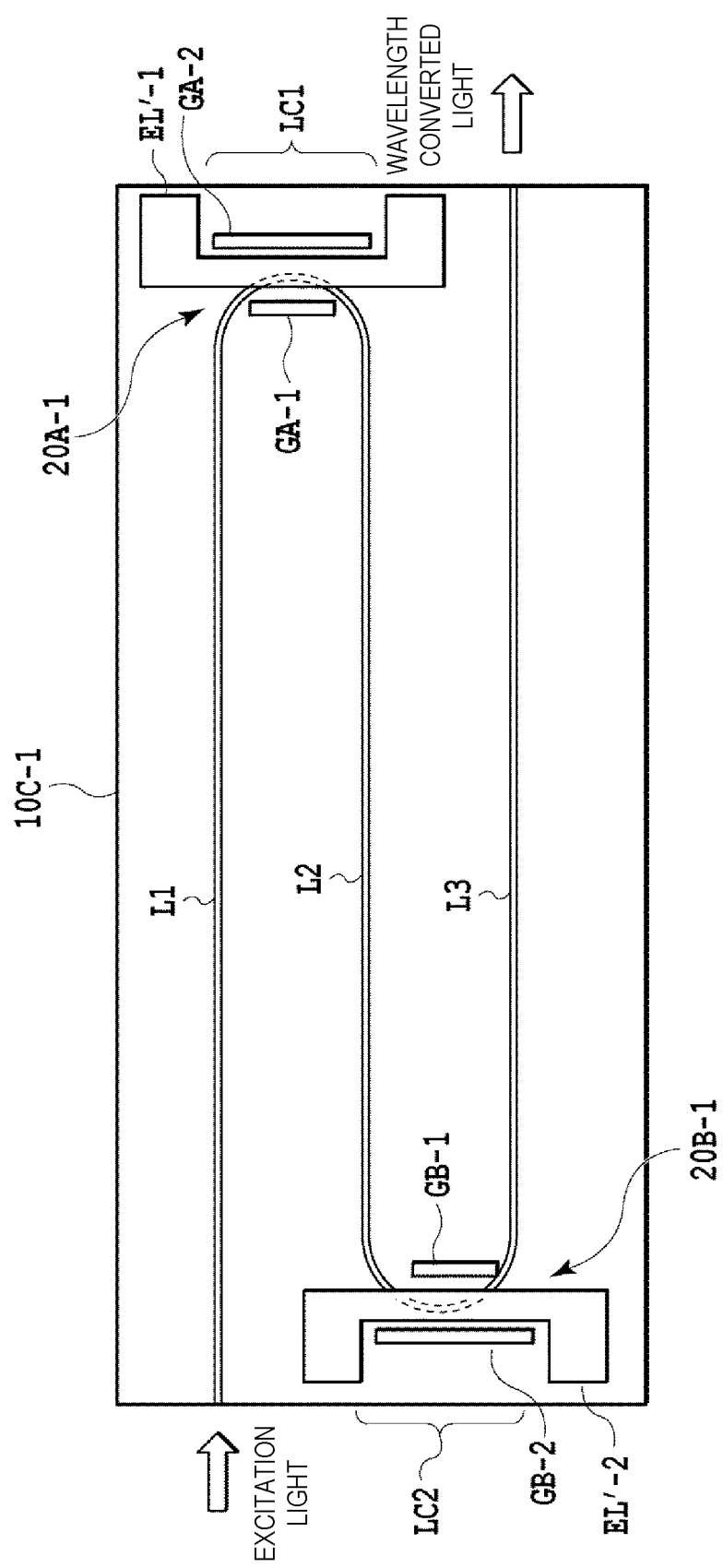
FIG. 11 is a plan view showing, from the upper surface direction, a detailed configuration including an electrode pattern in a ridge-type waveguide structure in the case in which an optical phase control mechanism using a thermo-optical effect is applied to a bent waveguide of a wavelength conversion optical element according to the third embodiment.

FIG. 11 is a plan view showing, from the upper surface direction, a basic configuration including an electrode pattern of a wavelength conversion optical element 10C-1 according to an example in a case in which a detailed configuration of the wavelength conversion optical element 10C according to the third embodiment is modified. That is, this wavelength conversion optical element 10C-1 shows an electrode pattern in the ridge-type waveguide structure in the case in which optical phase control mechanisms 20A-1 and 20B-1 using the thermo-optical effect are applied to the bent waveguides LC1 and LC2 of the wavelength conversion optical element 10C.

Referring to FIG. 11, in the wavelength conversion optical element 10C-1, an electrode EL'-1 close to a core of the bent waveguide LC1 in the optical phase control mechanism 20A-1 is provided on the upper surface of the buffer layer 34. Such a configuration is a configuration to which the electrode pattern explained with reference to FIG. 10 is applied. A heat insulating groove GA-1 is provided on the inner side and a heat insulating groove GA-2 is provided on the outer side to sandwich a part close to the bent waveguide LC1 of the electrode EL'-1.

Similarly, an electrode EL'-2 close to a core of the bent waveguide LC2 is provided on the upper surface of the buffer layer 34. Further, a heat insulating groove GB-1 is provided on the inner side and a heat insulating groove GB-2 is provided on the outer side to sandwich a part close to the bent waveguide LC2 of the electrode EL'-2. The other constituent portions are common to the wavelength conversion optical element 10C.

In the wavelength conversion optical element 10C-1, the linear waveguides L1, L2, and L3 that perform wavelength conversion are made of a ferroelectric containing lithium niobate as a main component. The directions of spontaneous polarization of the linear waveguides L1, L2, and L3 are periodically inverted. Lithium tantalate having a coefficient of thermal expansion close to a coefficient of thermal expansion of lithium niobate is used in a substrate of the wavelength conversion optical element 10C-1. Incidentally, a clad layer of SiO is interposed between the substrate and the bent waveguides LC1 and LC2 joining the substrate and the linear waveguides L1, L2, and L3.

A substance forming the waveguides (the linear waveguides L1, L2, and L3 and the bent waveguides LC1 and LC2) only has to be a nonlinear optical material. That is, the nonlinear optical material only has to be a material containing $LiNbO_3$ or $LiNbO_3$ described above as a main component and containing, as an additive, at least one kind selected from among Mg, Zn, Sc, and In in the main component. As explained above, a substance forming the clad layer only has to be a substance transparent with respect to lights in two wavelength bands in use such as a dielectric or a semiconductor such as silicon, silicon dioxide, lithium niobate, indium phosphide, or polymer or a compound obtained by adding an additive to the dielectric or the semiconductor.

This wavelength conversion optical element 10C-1 was designed such that a phase matching wavelength was 1.56 μm assuming optical communication applications such as a phase sensitive amplifier and a phase conjugate converter. Note that the phase matching wavelength is determined by the sizes of the cores of the waveguides and a spatial pitch of polarization inversion. The cores of the bent waveguides LC1 and LC2 and the linear waveguides L1, L2, and L3 were set to have a thickness of 1 μm and a width of 1.2 μm.

An interval among the linear waveguides L1, L2, and L3 disposed in parallel was set to 100 μm. A waveguide configuration included the three linear waveguides L1, L2, and L3 and the bent waveguides LC1 and LC2 in two parts. A ridge-type waveguide structure was applied to the waveguides. Heater electrodes were disposed to cover local parts of the bent waveguides LC1 and LC2. Incidentally, the heat insulating grooves GA-1 and GA-2 machined on both sides of the bent waveguide LC1 and the heat insulating grooves GB-1 and GB-2 machined on both sides of the bent waveguide LC2 are provided to efficiently transfer heat of heaters to the waveguides.

Therefore, in the wavelength conversion optical element 10C-1, a current value to the heaters was adjusted such that converted light intensity for making light incident in the waveguides as excitation light, converting the light in the linear waveguides L1, L2, and L3, and emitting the light as wavelength converted light was the largest. When wavelength conversion efficiency at this time was compared with wavelength conversion efficiency in the case of a configuration in which only one linear waveguide L was provided, it was successfully confirmed that the wavelength conversion efficiency at this time was remarkably large. Note that the electrode pattern of the optical phase control mechanisms 20A-1 and 20B-1 of the wavelength conversion optical element 10C-1 is also applicable to the embedded type explained with reference to FIG. 9.

FIG. 12 is a plan view showing, from the upper surface direction, a basic configuration including an electrode pattern of a wavelength conversion optical element 10C-2 according to another example in the case in which a detailed configuration of the wavelength conversion optical element 100 according to the third embodiment is modified. That is, this wavelength conversion optical element 10C-2 shows an electrode pattern in the ridge-type waveguide structure in the case in which optical phase control mechanisms 20A-2 and 20B-2 using the electro-optical effect are applied to the bent waveguides LC1 and LC2 of the wavelength conversion optical element 100.

Referring to FIG. 12, in the wavelength conversion optical element 10C-2, an electrode EL1'-1 close to the core of the bent waveguide LC1 in the optical phase control mechanism 20A-2 is provided on the upper surface of the buffer layer 32. Another electrode EL2'-1 is provided on the upper surface of the substrate slightly separated from the electrode EL1'-1. The electrode pattern explained with reference to FIG. 7 is applied to such a configuration.

Similarly, an electrode EM1'-2 close to the core of the bent waveguide LC2 is provided on the upper surface of the buffer layer 32. Further, another electrode EL2'-2 is also provided on the upper surface of the substrate slightly separated from the electrode EM1'-2. The other constituent portions are common to the wavelength conversion optical element 10C.

In the wavelength conversion optical element 10C-2, the linear waveguides L1, L2, and L3 that perform wavelength conversion are made of a ferroelectric containing lithium niobate as a main component. The directions of spontaneous polarization of the linear waveguides L1, L2, and L3 are periodically inverted. Lithium tantalate having a coefficient of thermal expansion close to a coefficient of thermal expansion of lithium niobate is used in a substrate of the wavelength conversion optical element 10C-2. Incidentally, a clad layer of SiO is also interposed between the substrate and the bent waveguides LC1 and LC2 joining the substrate and the linear waveguides L1, L2, and L3.

A substance forming the waveguides (the linear waveguides L1, L2, and L3 and the bent waveguides LC1 and LC2) only has to be a nonlinear optical material. That is, the nonlinear optical material only has to be a material containing $LiNbO_3$ or $LiNbO_3$ described above as a main component and containing, as an additive, at least one kind selected from among Mg, Zn, Sc, and In in the main component. As explained above, a substance forming the clad layer only has to be a substance transparent with respect to lights in two wavelength bands in use such as a dielectric or a semiconductor such as silicon, silicon dioxide, lithium niobate, indium phosphide, or polymer or a compound obtained by adding an additive to the dielectric or the semiconductor.

This wavelength conversion optical element 10C-2 was also designed such that a phase matching wavelength was 1.56 μm assuming optical communication applications such as a phase sensitive amplifier and a phase conjugate converter. Note that the phase matching wavelength is determined by the sizes of the cores of the waveguides and a spatial pitch of polarization inversion. The cores of the bent waveguides LC1 and LC2 and the linear waveguides L1, L2, and L3 were set to have a thickness of 1 μm and a width of 1.2 μm.

An interval among the linear waveguides L1, L2, and L3 disposed in parallel was set to 100 μm. A waveguide configuration included the three linear waveguides L1, L2, and L3 and the bent waveguides LC1 and LC2 in two parts. A ridge-type waveguide structure was applied to the waveguides. Sets of the electrodes EL1'-1 and EL2'-1 and the electrodes EM1'-2 and EL2'-2 were respectively disposed in the bent waveguides LC1 and LC2 such that electric fields were applied to the bent waveguides LC1 and LC2.

By giving potential differences respectively to these two sets of the electrodes EL1'-1 and EL2'-1 and the electrodes EM1'-2 and EL2'-2, electric fields are applied to the bent waveguides LC1 and LC2. That is, according to the Pockels effect of lithium niobate, a refractive index of the bent waveguides LC1 and LC2 changes and a phase relation between a fundamental wave and a multiplied wave is controlled.

Therefore, in the wavelength conversion optical element 10C-2, a voltage to be applied was adjusted such that converted light intensity for making light incident in the waveguides as excitation light, converting the light in the linear waveguides L1, L2, and L3, and emitting the light as wavelength converted light was the largest. When wavelength conversion efficiency at this time was compared with wavelength conversion efficiency in the case of a configuration in which only one linear waveguide L was provided, it was successfully confirmed that the wavelength conversion efficiency at this time was remarkably large. Note that the electrode pattern of the optical phase control mechanisms 20A-2 and 20B-2 of the wavelength conversion optical element 10C-2 is also applicable to the embedded type explained with reference to FIG. 6.

Note that the present invention is not limited to the embodiments explained above and can be variously modified in a range not departing from a technical gist of the present invention. All of the technical matters included in the technical idea described in claims are targets of the present invention. The embodiments show suitable examples. However, those skilled in the art can realize various modifications from the disclosed contents. In such a case, these modifications are included in the appended claims.

In any case, in the wavelength conversion optical elements of the present invention, for example, a device size does not change much even if the number of linear waveguides and the number of returns among the linear waveguides are increased. Moreover, temperature controllability of the entire element is relatively stably maintained. When a minimum size in element implementation is assumed, wasteless disposition of waveguides is enabled. Further, since the waveguides can be manufactured in a relatively small region, various advantages are achieved; for example, the influence of a machining error in a wafer surface in a basic process stage can be reduced.

REFERENCE SIGNS LIST 10A, 10B, 10C, 10C-1, 10C-2 Wavelength conversion optical element
20, 20', 20A, 20B, 20A-1, 20B-1, 20A-2, 20B-2 Optical phase control mechanism
E1, E2, E3 Wavelength conversion region
EL, EL', EL1, EL2, EL1', EL2', EL'-1, EL'-2, EL1'-1, EM1'-2, EL2'-1, EL2'-2 Electrode
GA-1, GA-2, GB-1, GB-2 Heat insulating groove
L1, L2, L3 Linear waveguide
LC, LC1, LC2 Bent waveguide

The invention claimed is:

1. A wavelength conversion optical element having a planar structure made of a second-order nonlinear optical material, comprising:
a wavelength conversion region in the planar structure includes at least two or more linear waveguides,
the two or more linear waveguides, excluding an incident side of excitation light and an emission side of wavelength converted light, are joined by at least one or more bent waveguides bent in a curved shape,
second-order nonlinear optical media forming the two or more linear waveguides respectively have polarization inversion structures in which directions of spontaneous polarization are periodically inverted with respect to a propagation direction of light,
wherein the one or more bent waveguides include an optical phase control mechanism that controls relative phases of the excitation light and the wavelength converted light according to a change in a refractive index,
wherein the optical phase control mechanism includes an electrode pattern using a thermo-optical effect,
wherein the electrode pattern is disposed according to a classification of an embedded type or a ridge type relating to the planar structure above the one or more bent waveguides, wherein the electrode pattern an insulating layer and an electrode on an upper surface of the insulating layer, and
a first heat insulating groove provided on an inner side of the one or more bent waveguides and a second heat insulating groove provided on an outer side of the one or more bent waveguides.

2. The wavelength conversion optical element according to claim 1, wherein the two or more linear waveguides are disposed in parallel to one another on a plane of the planar structure.

3. The wavelength conversion optical element according to claim 2, wherein polarization inversion periods of the polarization inversion structures in the two or more linear waveguides are an equal period.

4. The wavelength conversion optical element according to claim 2, wherein the second-order nonlinear optical media forming the two or more linear waveguides are made of a material containing $LiNbO_3$, or $LiNbO_3$ as a main component and containing, as an additive, at least one of Mg, Zn, Sc, and In in the main component.

5. The wavelength conversion optical element according to claim 1, wherein polarization inversion periods of the polarization inversion structures in the two or more linear waveguides are an equal period.

6. The wavelength conversion optical element according to claim 1, wherein the second-order nonlinear optical media forming the two or more linear waveguides are made of a material containing $LiNbO_3$, or $LiNbO_3$ as a main component and containing, as an additive, at least one of Mg, Zn, Sc, and In in the main component.

7. The wavelength conversion optical element according to claim 5, wherein the second-order nonlinear optical media forming the two or more linear waveguides are made of a material containing $LiNbO_3$, or $LiNbO_3$ as a main component and containing, as an additive, at least of Mg, Zn, Sc, and In in the main component.

* * * * *